United States Patent
Jia

(10) Patent No.: US 11,039,601 B1
(45) Date of Patent: Jun. 22, 2021

(54) CONTROL METHOD AND DEVICE FOR BARKING PROHIBITION IN BARKING PROHIBITION PIECE

(71) Applicant: SHENZHEN SMART PET TECHNOLOGY CO., LTD, Shenzhen (CN)

(72) Inventor: Yaya Jia, Shenzhen (CN)

(73) Assignee: SHENZHEN SMART PET TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/189,274

(22) Filed: Mar. 2, 2021

Related U.S. Application Data

(63) Continuation of application No. PCT/CN2020/108093, filed on Aug. 10, 2020.

(30) Foreign Application Priority Data

Dec. 23, 2019 (CN) .......................... 201911341236.0

(51) Int. Cl.
*A01K 15/02* (2006.01)
*H04R 1/08* (2006.01)
(Continued)

(52) U.S. Cl.
CPC ........... *A01K 15/022* (2013.01); *G01H 17/00* (2013.01); *G10L 25/51* (2013.01); *H04R 1/08* (2013.01)

(58) Field of Classification Search
CPC .. A01K 15/021; A01K 15/022; A01K 27/009; A01K 15/02; A01K 15/00; A01K 29/00; G01H 17/00; G10L 25/51
(Continued)

(56) References Cited

U.S. PATENT DOCUMENTS

| 6,588,376 B1 * | 7/2003 | Groh ..................... A01K 15/022 119/718 |
| 2010/0289639 A1 * | 11/2010 | Gibson ................ A01K 29/005 340/539.1 |

(Continued)

FOREIGN PATENT DOCUMENTS

CN 201869654 U 6/2011

OTHER PUBLICATIONS

International Search Report, Application No. PCT/CN2020/108093, dated Aug. 10, 2020.

*Primary Examiner* — Yvonne R Abbott-Lewis

(57) ABSTRACT

A control method for barking prohibition in a barking prohibition piece. This method includes: detecting a dog barking sound; detecting vibration characteristics of the dog barking sound; determining whether the dog barking sound has reached a preset noise level or whether the audio characteristic of dog barking has reached a preset audio characteristic; determining whether the detected vibration characteristics during dog barking include a head shaking characteristic and a dog-larynx vibration characteristic; and when the dog barking sound has reached the preset noise level or the audio characteristic of dog barking has reached the preset audio characteristic and the detected vibration characteristics during dog barking include the head shaking characteristic and the dog-larynx vibration characteristic, determining that the dog wearing the barking prohibition piece is barking and that a predefined barking prohibition trigger condition is satisfied, and sending a barking prohibition action to the dog wearing the barking prohibition piece.

10 Claims, 2 Drawing Sheets

(51) Int. Cl.
*G10L 25/51* (2013.01)
*G01H 17/00* (2006.01)

(58) Field of Classification Search
USPC ....... 119/718, 719, 908, 720, 712, 859, 721, 119/905; 340/573.3, 573.2, 573.1
See application file for complete search history.

(56) References Cited

U.S. PATENT DOCUMENTS

| | | | |
|---|---|---|---|
| 2013/0014706 A1* | 1/2013 | Menkes | A01K 27/009 |
| | | | 119/859 |
| 2014/0123912 A1* | 5/2014 | Menkes | A61B 5/02055 |
| | | | 119/859 |
| 2020/0387342 A1* | 12/2020 | Aoki | G06F 3/165 |
| 2020/0404886 A1* | 12/2020 | Gibbs | A01K 15/022 |

* cited by examiner

CONTROL METHOD AND DEVICE FOR BARKING PROHIBITION IN BARKING PROHIBITION PIECE

TECHNICAL FIELD

The present invention relates to the technical field of barking prohibition pieces, and more particularly to a control method and a device for barking prohibition in a barking prohibition piece.

BACKGROUND

Recently, with improvements in life standards, keeping bet dogs has become an important part of human life. In the neighborhood or other populated areas, many people are often taking their pet dogs for a walk. As such, there are increasingly more pet dogs, and these pet dogs would naturally bark for various reasons, for example, to signal other dogs, delimit their territories, behave out of excitement or horror, warn before attack, or the like. When a pet dog is stimulated by external sounds, it tends to bark and disturb others. To prevent pet dogs from frequent barking or prolonged barking, a pet-clog barking prohibition piece has been designed. When a pet dog barks, the pet dog can be stimulated to make it stop barking. However, in the presence of multiple pet dogs, it cannot be determined clearly which one is barking. Therefore, false action often occurs, causing the pet dog that is quiet to be triggered into barking. Therefore, it is necessary to address the problem of accurately determining which pet dog is barking and triggering barking prohibition for this dog to make it stop barking.

SUMMARY

Embodiments of the present invention aim to address the technical problem of providing a control method and a device for barking prohibition in a barking prohibition piece capable of accurately identifying dog barking which can accurately determine the barking dog and trigger barking prohibition for this dog to make it stop barking.

In a first aspect, the present invention provides a control method for barking prohibition in a barking prohibition piece that is worn on the body of a pet dog for prohibiting dog barking, including the steps of:

detecting a dog barking sound;

detecting vibration characteristics of the dog barking sound, where the vibration characteristics of the dog barking sound include a head shaking characteristic and a dog-larynx vibration characteristic during dog barking;

determining whether the dog barking sound has reached a preset noise level or whether the audio characteristic of dog barking has reached a preset audio characteristic;

determining whether the detected vibration characteristics during dog barking include a head shaking characteristic and a dog-larynx vibration characteristic; and determining that the dog wearing the barking prohibition piece is barking and that a predefined barking prohibition trigger condition is satisfied when the dog barking sound has reached the preset noise level or the audio characteristic of dog barking has reached the preset audio characteristic and the detected vibration characteristics during dog barking include the head shaking characteristic and the dog-larynx vibration characteristic, and sending a barking prohibition action to the dog.

In an optional design, the method further includes the steps of, prior to the step of detecting a dog barking sound:

presetting a noise level of the dog barking sound; and presetting an audio characteristic of the dog barking sound.

In an optional design, the method further includes the step of, subsequent to the step of determining whether the dog barking sound has reached a preset noise level or whether the audio characteristic of dog barking has reached a preset audio characteristic:

determining that the dog wearing the barking prohibition piece is quiet and the predefined barking prohibition trigger condition is unsatisfied when the dog barking sound is below the preset noise level or the audio characteristic of dog barking is below the preset audio characteristic, without sending a barking prohibition action to the dog.

In an optional design, the method further includes the step of, subsequent to the step of determining whether the detected vibration characteristics during dog barking include a head shaking characteristic and a dog-larynx vibration characteristic:

determining that the dog wearing the barking prohibition piece is quiet and the predefined barking prohibition trigger condition is unsatisfied when the detected vibration characteristics during dog barking include none of the head shaking characteristic and the dog-larynx vibration characteristic, without sending a barking prohibition action to the dog.

In an optional design, the dog barking sound is detected by an MIC, and the vibration characteristics during dog barking are detected by a motion sensor.

In an optional design, the barking prohibition action includes sound, vibration, ultrasound, or electro-static pulse.

In a second aspect, the present invention provides a control device for barking prohibition, including:

a dog barking sound detection module configured to detect a dog barking sound;

a dog barking sound vibration characteristic detection module configured to detect vibration characteristics of the dog barking sound, where the vibration characteristics of the dog barking sound includes a head shaking characteristic and a dog-larynx vibration characteristic during dog barking;

a dog barking sound characteristic analysis module configured to determine whether the dog barking sound has reached a preset noise level or whether the audio characteristic of dog barking has reached a preset audio characteristic;

a dog harking sound vibration characteristic analysis module configured to determine whether the vibration characteristics during dog barking detected by the dog barking sound vibration characteristic detection module include a head shaking characteristic and a dog-larynx vibration characteristic;

a central processing module configured to determine that the dog wearing the barking prohibition piece is barking and the predefined barking prohibition trigger condition is satisfied when it is determined by the dog barking sound characteristic analysis module that the dog barking sound has reached the preset noise level or the audio characteristic of dog barking has reached the preset audio characteristic and it is determined by the dog barking sound vibration characteristic analysis module that the vibration characteristics during dog barking include the head shaking characteristic and the dog-larynx vibration characteristic, and send a barking prohibition instruction to the barking prohibition module; and a barking prohibition module configured to receive the barking prohibition instruction sent from the central processing module and send a barking prohibition action to the dog wearing the barking prohibition piece.

In an optional design, the device further includes:

a preset module configured to preset the noise level of the dog barking sound and preset the audio characteristic of the dog barking sound.

In an optional design, the dog barking sound detection module is an MIC and the dog barking sound vibration characteristic detection module is a motion sensor.

In an optional design, the barking prohibition action includes sound, vibration, ultrasound, or electro-static pulse.

The present invention has the following beneficial effects. The control method for barking prohibition in a barking prohibition piece provided by the present invention includes: detecting a dog barking sound; detecting vibration characteristics of the dog barking sound; determining whether the dog barking sound has reached a preset noise level or whether the audio characteristic of dog barking has reached a preset audio characteristic; determining whether the detected vibration characteristics during dog barking include a head shaking characteristic and a dog-larynx vibration characteristic; and if the dog barking sound has reached the preset noise level or the audio characteristic of dog barking has reached the preset audio characteristic and the detected vibration characteristics during dog barking include the head shaking characteristic and the dog-larynx vibration characteristic, determining that the dog wearing the barking prohibition piece is barking and that a predefined barking prohibition trigger condition is satisfied, and sending a barking prohibition action to the dog wearing the barking prohibition piece. As such, the predefined barking prohibition trigger condition is satisfied and a barking prohibition action is sent to the dog wearing the barking prohibition piece only if the dog barking sound has reached the preset noise level or the audio characteristic of dog barking has reached the preset audio characteristic and the detected vibration characteristics during dog barking include the head shaking characteristic and the dog-larynx vibration characteristic. In this way, dog barking can be accurately identified and the barking dog can be accurately determined, so that bark prohibition is triggered for this dog to make it stop barking. Therefore, it is possible to prevent the case where in the presence of multiple dogs, the barking dog cannot be accurately identified, resulting in many false actions and easily causing the bark prohibition to be triggered for the dog that is quiet.

BRIEF DESCRIPTION OF THE DRAWINGS

In order to explain the technical solution of the present invention more clearly, the drawings used in the embodiments will be briefly described below Obviously, the drawings in the following description are merely some embodiments of the present invention, and other drawings can be obtained on the basis of these drawings by those of ordinary skills in the art without creative efforts.

DESCRIPTION OF THE EMBODIMENTS

Embodiments of the present invention will be described below with reference to the drawings in the embodiments of the present invention.

In order to make the purpose, technical solution and advantages of the present invention more apparent, the embodiments of the present invention will be further described in detail with reference to the drawings.

When the following description refers to the drawings, unless otherwise indicated, the same numbers in different drawings refer to the same or similar elements. The implementations described in the following exemplary embodiments do not represent all implementations consistent with the present invention. Rather, they are merely examples of the device and method consistent with some aspects of the present invention as detailed in the appended claims.

In the description of the present invention, it should be understood that the terms "first", "second", etc. are intended merely for descriptive purposes and shall not be understood as indicating or implying relative importance. For those of ordinary skills in the art, the specific meanings of the above terms in the present invention can be understood in specific situations. In addition, in the description of the present invention, unless otherwise specified, the expression "a plurality of" means two or more, the expression "and/or", which describes the relationship between related objects, means that there can be three types of relationships, for example; A and/or B can mean three situations: A alone exists, both A and B exist, and B alone exists. The character "/" generally indicates the relationship of "or" between the related objects.

Figure 1:
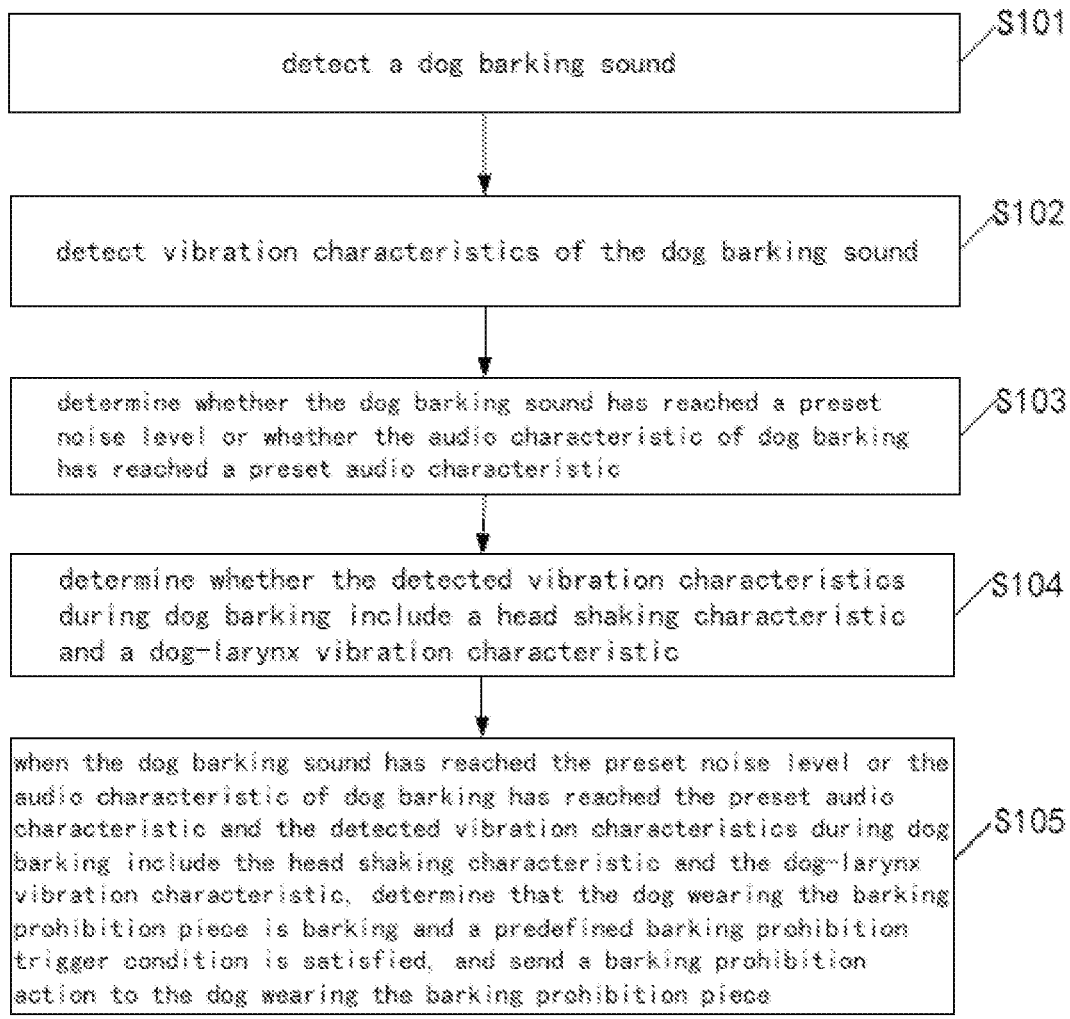
FIG. 1 is a schematic flow diagram of a control method for barking prohibition in a barking prohibition piece according to an embodiment of the present invention.

Referring to FIG. 1, which illustrates a control method for barking prohibition in a barking prohibition piece according to an embodiment of the present invention, the barking prohibition piece being worn on the body of a pet dog for prohibiting dog barking, including the following steps.

S101: detecting a dog barking sound.

In an optional design, the method further includes a step of, prior to the step of detecting a dog barking sound:

presetting a noise level of the dog barking sound; and
presetting an audio characteristic of dog barking.

In an optional design, the dog barking sound is detected by an MIC.

S102: detecting vibration characteristics of the dog barking sound, where the vibration characteristics of the dog barking sound includes a head shaking characteristic and a dog-larynx vibration characteristic during dog barking.

In an optional design, the vibration characteristics during dog barking is detected by a motion sensor.

S103: determining whether the dog barking sound has reached a preset noise level or whether the audio characteristic of dog barking has reached a preset audio characteristic.

In an optional design, the method further includes a step of, subsequent to the step of determining whether the dog barking sound has reached a preset noise level or whether the audio characteristic of dog barking has reached a preset audio characteristic:

when the dog barking sound has not reached the preset noise level or the audio characteristic of dog barking has not reached the preset audio characteristic, determining that the dog wearing the barking prohibition piece is quiet and a predefined barking prohibition trigger condition is unsatisfied, without sending a barking prohibition action to the dog wearing the barking prohibition piece.

It is noted that, in an embodiment of the present invention, the audio characteristic of dog barking includes continued and rapid barking, lengthy or constant barking, single sharp and short barking, single sharp and rapid barking, a succession of squealing, gradually louder barking, roaring barking at a mid-high pitch, fluctuated roaring, or noisy roaring.

S104: determining whether the detected vibration characteristics during dog barking include a head shaking characteristic and a dog-larynx vibration characteristic.

In an optional design, the method further includes a step of, subsequent to the step of determining whether the detected vibration characteristics during dog barking include a head shaking characteristic and a dog-larynx vibration characteristic:

when the detected vibration characteristics during dog barking do not include a head shaking characteristic and a dog-larynx vibration characteristic, determining that the dog wearing the barking prohibition piece is quiet and a predefined barking prohibition trigger condition is unsatisfied, without sending a barking prohibition action to the dog wearing the barking prohibition piece.

S105: when the dog barking sound has reached the preset noise level or the audio characteristic of dog barking has reached the preset audio characteristic and the detected vibration characteristics during dog barking include the head shaking characteristic and the dog-larynx vibration characteristic, determining that the dog wearing the barking prohibition piece is barking and the predefined barking prohibition trigger condition is satisfied, and sending a barking prohibition action to the dog wearing the barking prohibition piece.

In an optional design, the barking prohibition action includes sound, vibration, ultrasound, or electro-static pulse. It is noted that the barking prohibition action described in this embodiment is not limited to including sound, vibration, ultrasound, or electro-static pulse, but may include other means or a combination of different means. For example, it may include a combination of sound, vibration and ultrasound, a combination of sound and ultrasound, a combination of vibration and ultrasound, a combination of sound, vibration, and electro-static pulse, a combination of sound and electro-static pulse, or a combination of vibration and electro-static pulse, No limitation is made in this respect by the present invention, as long as the effect of barking prohibition is provided.

The present invention has the following beneficial effects. The control method for barking prohibition in a barking prohibition piece provided by the present invention includes: detecting a dog barking sound; detecting vibration characteristics of the dog barking sound; determining whether the dog barking sound has reached a preset noise level or whether the audio characteristic of dog barking has reached a preset audio characteristic; determining whether the detected vibration characteristics during dog barking include a head shaking characteristic and a dog-larynx vibration characteristic; and when the dog barking sound has reached the preset noise level or the audio characteristic of dog barking has reached the preset audio characteristic and the detected vibration characteristics during dog barking include the head shaking characteristic and the dog-larynx vibration characteristic, determining that the dog is barking and that the predefined barking prohibition trigger condition is satisfied, and sending a barking prohibition action to the dog. As such, the predefined barking prohibition trigger condition is satisfied and a barking prohibition action is sent to the dog wearing the barking prohibition piece only if the dog barking sound has reached the preset noise level or the audio characteristic of dog barking has reached the preset audio characteristic and the detected vibration characteristics during dog barking include the head shaking characteristic and the dog-larynx vibration characteristic. In this way, dog barking can be accurately identified and the barking dog can be accurately determined, so that bark prohibition is triggered for this dog to make it stop barking. Therefore, it is possible to prevent the case where in the presence of multiple dogs, the barking dog cannot be accurately identified, resulting in many false actions and easily causing the dog that is quiet to be triggered into barking.

The method according to an embodiment of the present invention has been described in detail and a device according to an embodiment of the present invention is to be described below.

Figure 2:
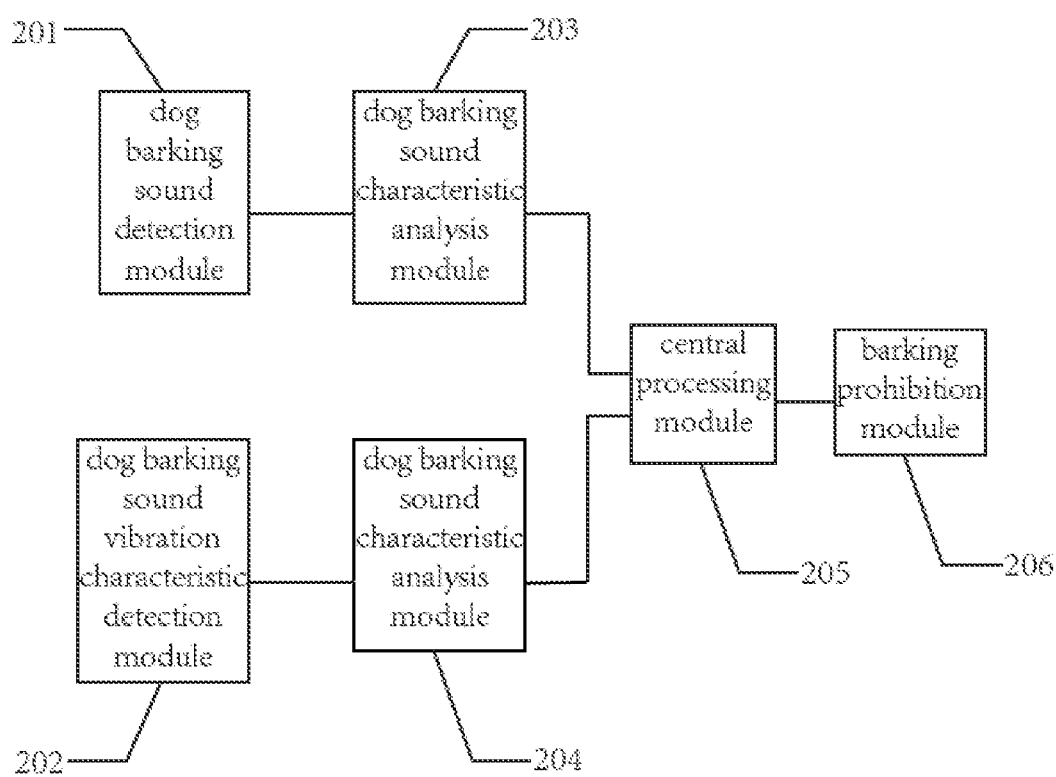
FIG. 2 is a schematic structural view of a control device for barking prohibition in a barking prohibition piece according to an embodiment of the present invention.

Referring to FIG. 2, which is a schematic structural view of a control device for barking prohibition in a barking prohibition piece according to an embodiment of the present invention, this control device includes a dog barking sound detection module 201, a dog barking sound vibration characteristic detection module 202, a dog barking sound characteristic analysis module 203, a dog barking sound vibration characteristic analysis module 204, a central processing module 205, and a barking prohibition module 206. The individual units are to be described in detail below.

The dog barking sound detection module 201 is configured to detect a dog barking sound.

The dog barking sound vibration characteristic detection module 202 is configured to detect vibration characteristics of the dog barking sound, where the dog vibration characteristics of the dog barking sound include a head shaking characteristic and a dog-larynx vibration characteristic during dog barking.

The dog barking sound characteristic analysis module 203 is configured to determine whether the dog barking sound detected by the dog barking sound detection module 201 has reached a preset noise level or whether the audio characteristic of dog barking has reached a preset audio characteristic.

The dog barking sound vibration characteristic analysis module 204 is configured to determine whether the vibration characteristics during dog barking detected by the dog barking sound vibration characteristic detection module 202 include a head shaking characteristic and a dog-larynx vibration characteristic.

The central processing module 205 is configured to, when it is determined, by the dog barking sound characteristic analysis module 203, that the dog barking sound has reached a preset noise level or the audio characteristic of dog barking has reached a preset audio characteristic and it is determined, by the dog barking sound vibration characteristic analysis module 204, that the vibration characteristics during dog barking include a head shaking characteristic and a dog-larynx vibration characteristic; determine that the dog wearing the barking prohibition piece is barking and the predefined barking prohibition trigger condition is satisfied and send a barking prohibition instruction to the barking prohibition module.

The barking prohibition module 206 is configured to receive the barking prohibition instruction sent from the central processing module 205 and send a barking prohibition action to the dog wearing the barking prohibition piece.

In an optional design, the dog barking sound detection module 201 is an MC and the dog barking sound vibration characteristic detection module 202 is a motion sensor.

In an optional design, the barking prohibition action includes sound, vibration, ultrasound, or electro-static pulse.

It is noted that the device according to this embodiment of the present invention further includes a preset module configured to preset the noise level of the dog barking sound and preset the audio characteristic of the dog barking sound.

The present invention has the following beneficial effects. In the control device for barking prohibition in a barking prohibition piece provided by the present invention, the dog barking sound characteristic analysis module 203 is configured to determine whether the dog barking sound detected by the dog barking sound detection module 201 has reached a preset noise level or whether the audio characteristic of dog barking has reached a preset audio characteristic; the dog barking sound vibration characteristic analysis module 204 is configured to determine whether the vibration characteristics during dog barking detected by the dog barking sound vibration characteristic detection module 202 include a head shaking characteristic and a dog-larynx vibration characteristic; and the central processing module 205 is configured to, if it is determined, by the dog barking sound characteristic analysis module 203, that the dog barking sound has reached the preset noise level or the audio characteristic of dog barking has reached the preset audio characteristic and it is determined, by the dog barking sound vibration characteristic analysis module 204, that vibration characteristics during dog barking include the head shaking characteristic and the dog-larynx vibration characteristic, determine that the dog wearing the barking prohibition piece is barking and that the predefined barking prohibition trigger condition is satisfied, and send a barking prohibition instruction to the bark prohibition module 206; and the barking prohibition module 206 is configured to receive the barking prohibition instruction sent from the central processing module 205 and send a barking prohibition action to the dog wearing the barking prohibition piece. As such, the central processing module 205 determines that the predefined barking prohibition trigger condition is satisfied and sends a barking prohibition action to the dog wearing the barking prohibition piece only if the dog barking sound has reached the preset noise level or the audio characteristic of dog barking has reached the preset audio characteristic and the detected vibration characteristics during dog barking include the head shaking characteristic and the dog-larynx vibration characteristic. In this way, dog barking can be accurately identified and the barking dog can be accurately determined, so that bark prohibition is triggered for this dog to make it stop barking. Therefore, it is possible to prevent the case where in the presence of multiple dogs, the barking dog cannot be accurately identified, resulting in many false actions and easily causing the bark prohibition to be triggered for the dog that is quiet.

The processing device 2 mentioned in an embodiment of the present invention can also be a field-programmable gate array (FPGA), an application specific integrated chip, a system on chip (SoC), a central processor unit ((PU), a network processor (NIP), a digital signal processing circuit, a micro controller unit (MCU), and a programmable logic device (PLD) or other integrated chips that provide relevant functions.

Those of ordinary skill in the art can realize that the units and algorithm steps in each example described in connection with the embodiments disclosed herein can be implemented in electronic hardware, or a combination of computer software and electronic hardware. Whether these functions are implemented in hardware or software depends on the specific application and design constraints of the technical solution. Skilled artisans can use different methods to implement the described functions for each specific application, but such implementation should not be considered as departure from the scope of the present invention.

It can be clearly understood by those skilled in the art that for the convenience and conciseness of description, the specific operating processes of the systems, devices and units described above shall not be described in detail again herein, and reference may be made to the corresponding processes in the aforementioned method embodiments.

It should be understood that, in several embodiments provided in the present invention, the disclosed system, device and method can be implemented in other ways. For example, the device embodiment described above is merely illustrative. For example, the units are divided merely based on their logical functions. In practical implementation, they may be divided in other manners. For example, multiple units or components can be combined or integrated into another system, or some features can be omitted or not implemented. On the other hand, the mutual coupling or direct coupling or communication connection shown or discussed may alternatively be indirect coupling or communication connection through some interfaces, and the indirect coupling or communication connection between the devices or units may be electrical, mechanical or otherwise.

The units described as separated components may be or may not be physically separated, and the components displayed as units may be or may not be physical units, that is, they may be located in one place or distributed on multiple network units. Some or all of the units can be selected according to actual needs to achieve the purpose of this implementation.

In addition, individual functional units in embodiments of the present invention may be integrated into one processing unit, or individual units may physically exist separately, or two or more units may be integrated into one unit.

In the above embodiments, the present invention can be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, the flow or function according to the embodiment of the present invention is generated in whole or in part. The computer can be a general purpose computer, a special purpose computer, a computer network, or other programmable devices. The computer instructions may be stored in a computer-readable storage medium or transmitted through the computer-readable storage medium. The computer instructions can be transmitted from one website, computer, server or data center to another in a wired (such as coaxial cable, optical fiber, digital subscriber line (DSL) or wireless (such as infrared, wireless, microwave, etc.) manner. The computer-readable storage medium can be any available medium that can be accessed by a computer, or data storage devices such as servers and data centers that contain one or more integrated available media. The available media can be magnetic media (e.g., floppy disk, hard disk, magnetic tape), optical media (e.g., MID), or semiconductor media (e.g., Solid State Disk (SSD)) or the like.

Those of ordinary skill in the art can understand the implementation of all or part of the flow in the method of the above embodiments, which can be completed by related hardware as instructed by computer programs, which can be stored in computer-readable storage media, and which, when executed, can include the flow of the above method embodiments. The aforementioned storage media include ROM or Random Access Memory (RAM), magnetic disk or optical disk, and other media which can store program codes.

What is claimed is:

1. A control method for barking prohibition in a barking prohibition piece that is worn on the body of a pet dog for prohibiting dog barking, comprising the steps of:
    detecting a dog barking sound;

detecting vibration characteristics of the dog barking sound; wherein the vibration characteristics of the dog barking sound comprise a head shaking characteristic and a dog-larynx vibration characteristic during dog barking;

determining whether the dog barking sound has reached a preset noise level or whether the audio characteristic of dog barking has reached a preset audio characteristic;

determining whether the detected vibration characteristics during dog barking comprise a head shaking characteristic and a dog-larynx vibration characteristic; and determining that the dog wearing the barking prohibition piece is barking and that a predefined barking prohibition trigger condition is satisfied when the dog barking sound has reached the preset noise level or the audio characteristic of dog barking has reached the preset audio characteristic and the detected vibration characteristics during dog barking comprise the head shaking characteristic and the dog-larynx vibration characteristic, and sending a barking prohibition action to the dog.

2. The control method for barking prohibition in a barking prohibition piece of claim 1, further comprising the steps of, prior to the step of detecting a dog barking sound:

presetting a noise level of the dog barking sound; and
presetting an audio characteristic of the dog barking sound.

3. The control method for barking prohibition in a barking prohibition piece of claim 1, further comprising the step of, subsequent to the step of determining whether the dog barking sound has reached a preset noise level or whether the audio characteristic of dog barking has reached a preset audio characteristic:

determining that the dog wearing the barking prohibition piece is quiet and the predefined harking prohibition trigger condition is unsatisfied when the dog barking sound is below the preset noise level or the audio characteristic of dog barking is below the preset audio characteristic, without sending a barking prohibition action to the dog.

4. The control method for harking prohibition in a barking prohibition piece of claim 1, further comprising the step of, subsequent to the step of determining whether the detected vibration characteristics during dog barking comprise a head shaking characteristic and a dog-larynx vibration characteristic:

determining that the dog wearing the barking prohibition piece is quiet and the predefined barking prohibition trigger condition is unsatisfied when the detected vibration characteristics during dog barking comprise none of the head shaking characteristic and the dog-larynx vibration characteristic, without sending a barking prohibition action to the dog.

5. The control method for barking prohibition in a barking prohibition piece of claim 1, wherein the dog barking sound is detected by an WC; and
the vibration characteristics during dog barking are detected by a motion sensor.

6. The control method for barking prohibition in a barking prohibition piece of claim 1, wherein the barking prohibition action comprises sound, vibration, ultrasound, or electrostatic pulse.

7. A control device for barking prohibition in a barking prohibition piece, comprising:

a dog barking sound detection module configured to detect a dog barking sound;

a dog barking sound vibration characteristic detection module configured to detect vibration characteristics of the dog barking sound, wherein the vibration characteristics of the dog barking sound comprise a head shaking characteristic and a dog-larynx vibration characteristic during dog barking;

a dog barking sound characteristic analysis module configured to determine whether the dog barking sound has reached a preset noise level or whether the audio characteristic of dog barking has reached a preset audio characteristic;

a dog barking sound vibration characteristic analysis module configured to determine whether the vibration characteristics during dog barking detected by the dog barking sound vibration characteristic detection module comprise a head shaking characteristic and a dog-larynx vibration characteristic;

a central processing module configured to determine that the dog wearing the barking prohibition piece is barking and a predefined barking prohibition trigger condition is satisfied when it is determined by the dog barking sound characteristic analysis module that the dog barking sound has reached the preset noise level or the audio characteristic of dog barking has reached the preset audio characteristic and it is determined by the dog barking sound vibration characteristic analysis module that the vibration characteristics during dog barking comprise the head shaking characteristic and the dog-larynx vibration characteristic, and send a barking prohibition instruction to a barking prohibition module; and the barking prohibition module configured to receive the barking prohibition instruction sent from the central processing module and send a barking prohibition action to the dog wearing the barking prohibition piece.

8. The control device for barking prohibition in a barking prohibition piece of claim 7, further comprising:

a preset module configured to preset the noise level of the dog barking sound and preset the audio characteristic of the dog barking sound.

9. The control device for barking prohibition in a barking prohibition piece of claim 7, wherein the dog barking sound detection module is an MIC and the dog barking sound vibration characteristic detection module is a motion sensor.

10. The control device for barking prohibition in a barking prohibition piece of claim 7, wherein the barking prohibition action comprises sound, vibration, ultrasound, or electrostatic pulse.

* * * * *